April 20, 1937.   A. H. MASCHMEYER   2,078,090
PATTERN SORTING DEVICE
Filed Jan. 24, 1935      15 Sheets-Sheet 1

FIG. I.

INVENTOR
A.H. MASCHMEYER
BY *[signature]*
HIS ATTORNEY

April 20, 1937.　　A. H. MASCHMEYER　　2,078,090
PATTERN SORTING DEVICE
Filed Jan. 24, 1935　　15 Sheets-Sheet 2

INVENTOR
A.H. MASCHMEYER
BY
HIS ATTORNEY

April 20, 1937.   A. H. MASCHMEYER   2,078,090
PATTERN SORTING DEVICE
Filed Jan. 24, 1935   15 Sheets-Sheet 3

INVENTOR
A.H.MASCHMEYER
BY *W.A. Sparks*
HIS ATTORNEY

April 20, 1937. A. H. MASCHMEYER 2,078,090
PATTERN SORTING DEVICE
Filed Jan. 24, 1935 15 Sheets-Sheet 4

INVENTOR
A. H. MASCHMEYER
BY
HIS ATTORNEY

INVENTOR
A.H. MASCHMEYER
BY *W.A. Spark*
HIS ATTORNEY

April 20, 1937.  A. H. MASCHMEYER  2,078,090
PATTERN SORTING DEVICE
Filed Jan. 24, 1935  15 Sheets-Sheet 7

INVENTOR
A.H. MASCHMEYER
BY *H.A.Sparks*
HIS ATTORNEY

April 20, 1937. A. H. MASCHMEYER 2,078,090
PATTERN SORTING DEVICE
Filed Jan. 24, 1935 15 Sheets-Sheet 8

INVENTOR
A.H. MASCHMEYER
BY
HIS ATTORNEY

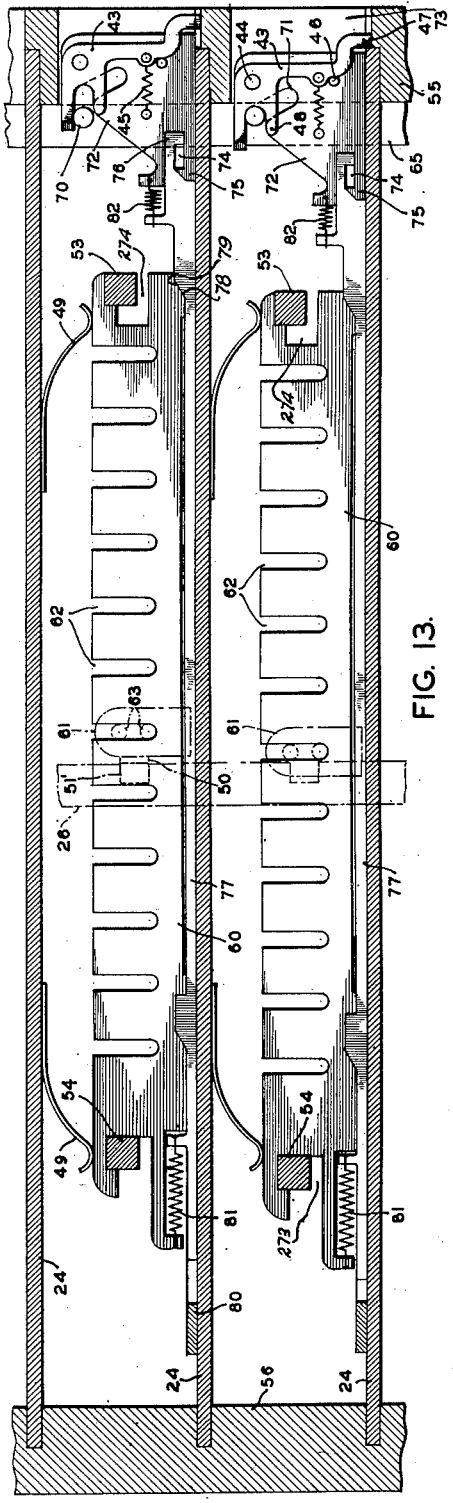

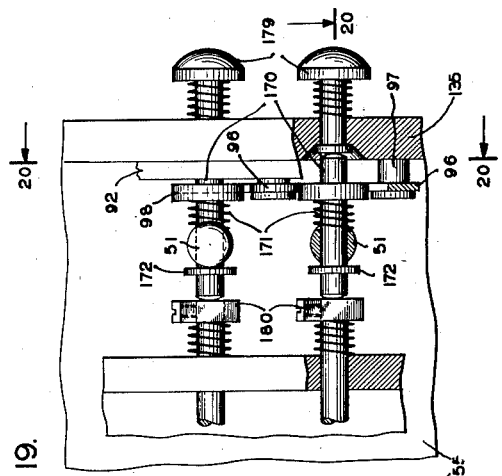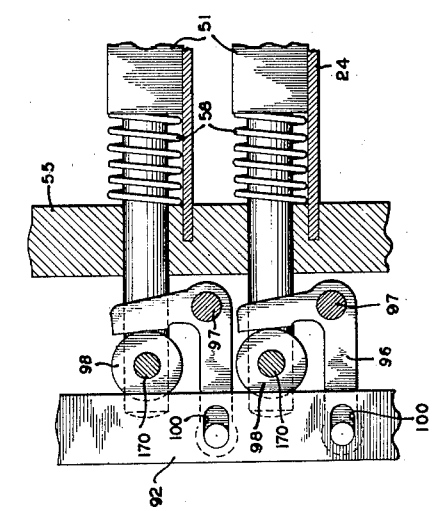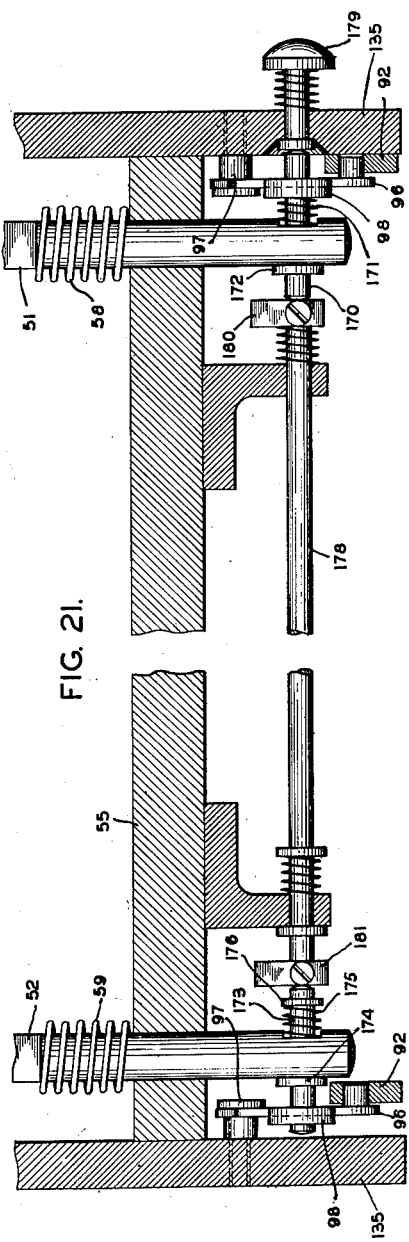

April 20, 1937. A. H. MASCHMEYER 2,078,090
PATTERN SORTING DEVICE
Filed Jan. 24, 1935 15 Sheets-Sheet 14
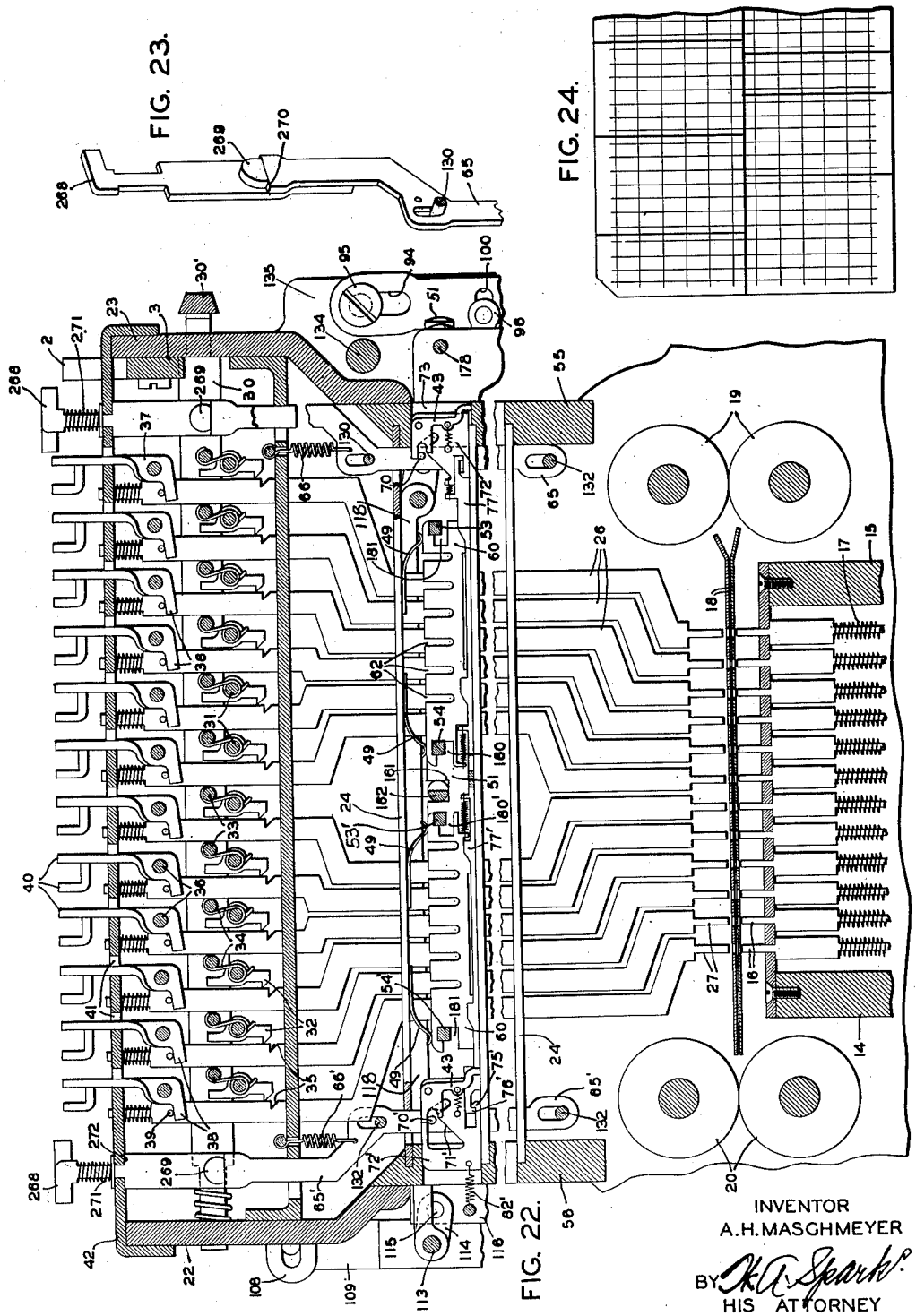
INVENTOR
A.H.MASCHMEYER
BY
HIS ATTORNEY Patented Apr. 20, 1937

2,078,090

UNITED STATES PATENT OFFICE 2,078,090

PATTERN SORTING DEVICE

August H. Maschmeyer, Astoria, N. Y., assignor to Remington Rand Inc., Buffalo, N. Y., a corporation of Delaware Application January 24, 1935, Serial No. 3,218

16 Claims. (Cl. 209—110)

This invention relates to machines for sorting perforated cards such as are used in automatic calculating and adding machines.

In known sorters, it is customary to sort cards according to the location of a single perforation, or in some cases a group of perforations, such groups being used in a code to represent a single character.

Such sorters are capable of sorting from one column at a time, though occasionally, for special purposes, machines are modified to include perforations in other columns.

An object of this invention is to provide a sorter which sorts the pattern punched in a card, rather than single characters. It is to be understood that the term "pattern" denotes the spatial arrangements of the perforations on a card which represent the data recorded on the card, while the term "selected pattern" denotes the spatial arrangement of the perforations on selected areas of a card which represent the data recorded in these areas.

A further object is to enable punched cards to be automatically sorted in accordance with a number of different patterns or with a number of selected patterns during a single run of the cards.

Another object is to enable punched cards to be automatically sorted in accordance with a number of different patterns and selected patterns during a single run of the cards.

A further object is to enable the patterns or selected patterns according to which the punched cards are sorted, to be sorted at will to permit the cards to be sorted according to any desired patterns or selected patterns.

An additional object is to enable a single sensing operation to determine whether or not a card is to be sorted, whereby the cards may be successively sensed and either sorted in the proper card pockets or deposited in a reject pocket.

Another object is the provision of a sorter having a selecting mechanism for controlling a plurality of card pockets; the selecting mechanism being adjustable, so that cards of different patterns may be successively sensed, and like patterns grouped in predetermined card pockets.

A further object is the provision of a card sorter for sorting card patterns in which desired columns of the selecting mechanism may be disabled at will.

Other objects will appear in the following specification:

Referring now to the drawings:

Fig. 13 shows first position of the vertical disabling link in reference to the minor pin carriers, prior to a disabling operation.

Fig. 14 shows a pair of minor pin carriers, one of which is disabled.

Figs. 19, 20 and 21 show details of mechanism used in connection with minor pin setting mechanism, Fig. 19 being an elevation, partly in section, Fig. 20, a section taken through 20—20 of Fig. 19 and Fig. 21 a top view.

Fig. 22 shows a modification of the invention adapted to be used in sorting 90 column cards.

Fig. 23 is a perspective of a key.

Fig. 24 represents a 90 column card.

A framework, partly shown in the various drawings, is mounted on a suitable stand and supports the card feeding, sensing and selecting mechanism as well as the card pocket mechanism.

The card feeding means may be of any suitable type for successively projecting cards, one at a time, from a stock or supply into a mechanism for selecting card pockets, while the card pocket mechanism may be of any suitable type which operates to receive a card at the time the card reaches the pocket. Card feeding and card pocket mechanism suitable for use with the present invention are disclosed in patents to Lasker No. 1,315,370, dated Sept. 9, 1919, and 1,476,161, dated Dec. 4, 1923, though it is to be understood that other suitable mechanism of the type mentioned, which is well known in the punched card art, may, if desired, be employed.

The card feeding mechanism preferably of the kind disclosed in the above patents, feeds the cards into a sensing chamber, where the cards may control a combined sensing and selecting mechanism which, in turn, governs the operation of the gates to the various card pockets.

The selecting mechanism includes a number of pocket selecting sections, arranged one above the other, each of which consists of a framework supporting an assembly of members which is reciprocated laterally with every cycle of operation. In each assembly there is a set of elements, referred to hereinafter as minor pins. The minor pins in each section may be manually set to correspond to the various card patterns to be sorted. The minor pins have laterally projecting lugs which cooperate with notches or recesses in a set of vertically reciprocated plates common to all sections, the lower ends of said plates being suitably formed to serve as card sensing pins. These plates are vertically displaced according to the pattern of the card being sensed, and for ease in identification will be referred to hereinafter as major pins. When the lugs of all minor pins in a section are aligned with the recesses in the major pins and the assembly reciprocates, the lugs enter the recesses in the major pins permitting that particular assembly to reciprocate a distance greater than its usual path and thus operate a Bowden wire which controls the gate of a card pocket. The gate of the card pocket selected by the sensed card is timed to open at the time the sensed card reaches it, thereby insuring that the card will be deposited in the proper card pocket. It will be understood that each time a card is sensed, that the major pins, or card sensing pins, are themselves sensed by a cross combing action of the minor pins and their respective carriers.

Figure 2:
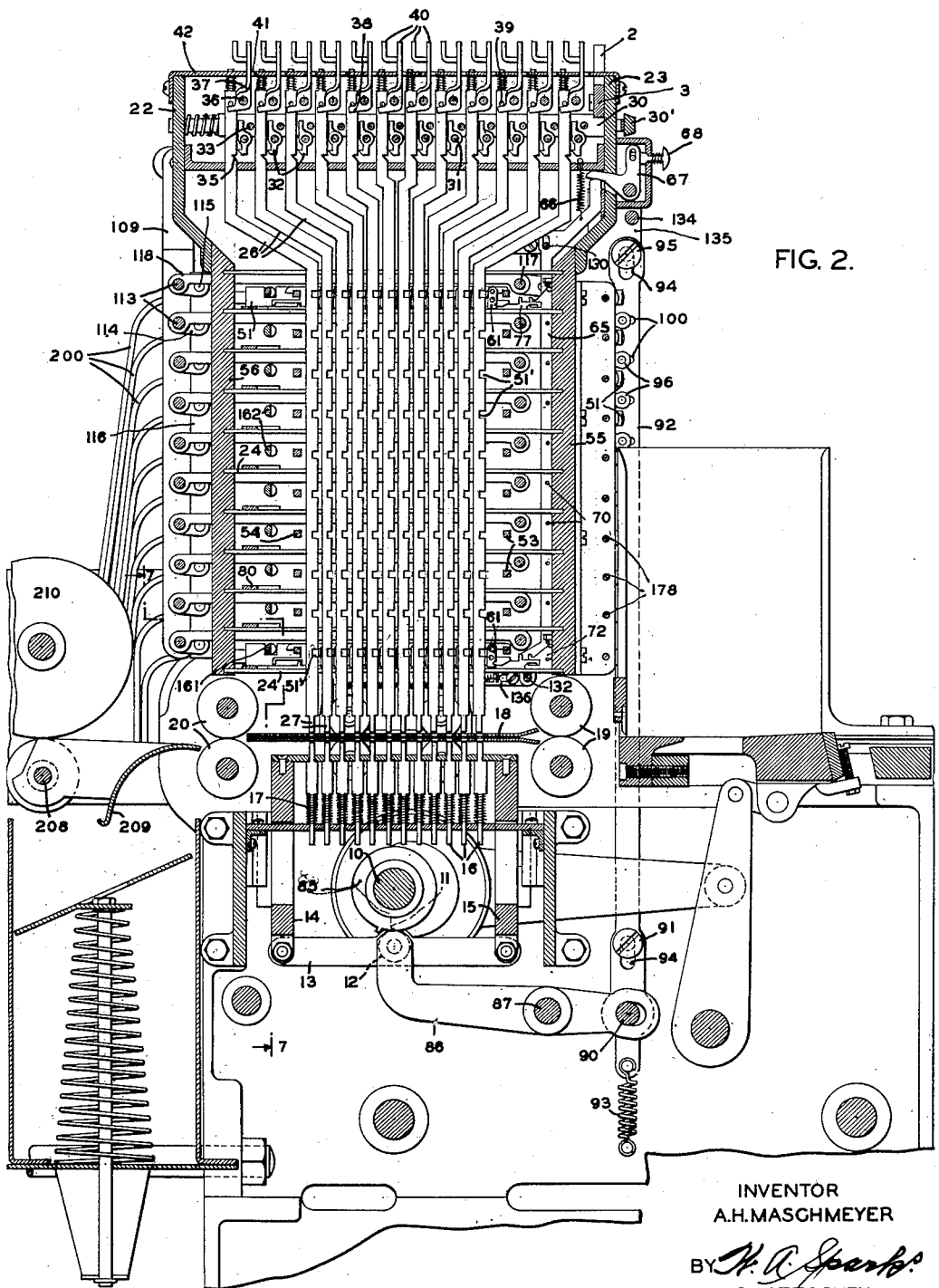
Fig. 2 is a detailed vertical section.
Figure 4:
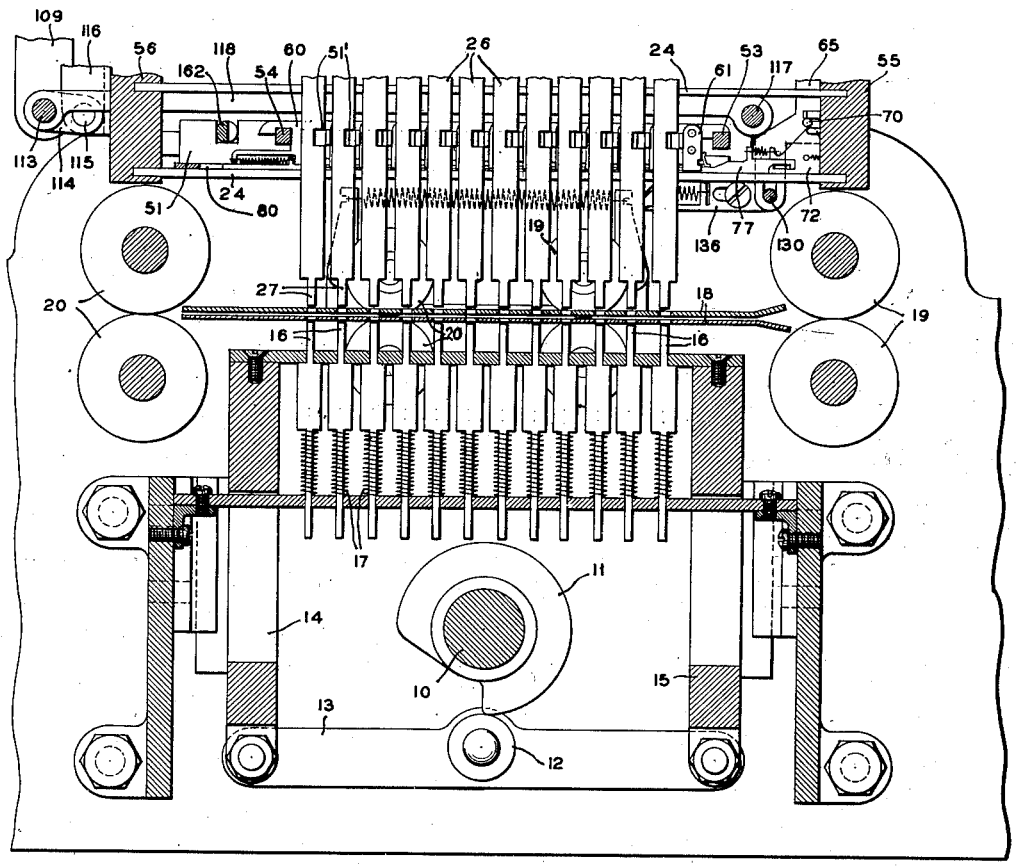
Fig. 4 is an enlarged section of the sensing mechanism.
Figure 5:
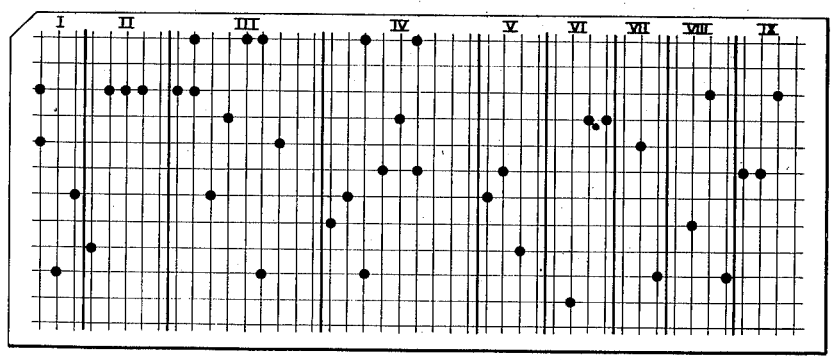
Fig. 5 shows a card.
Figure 7:
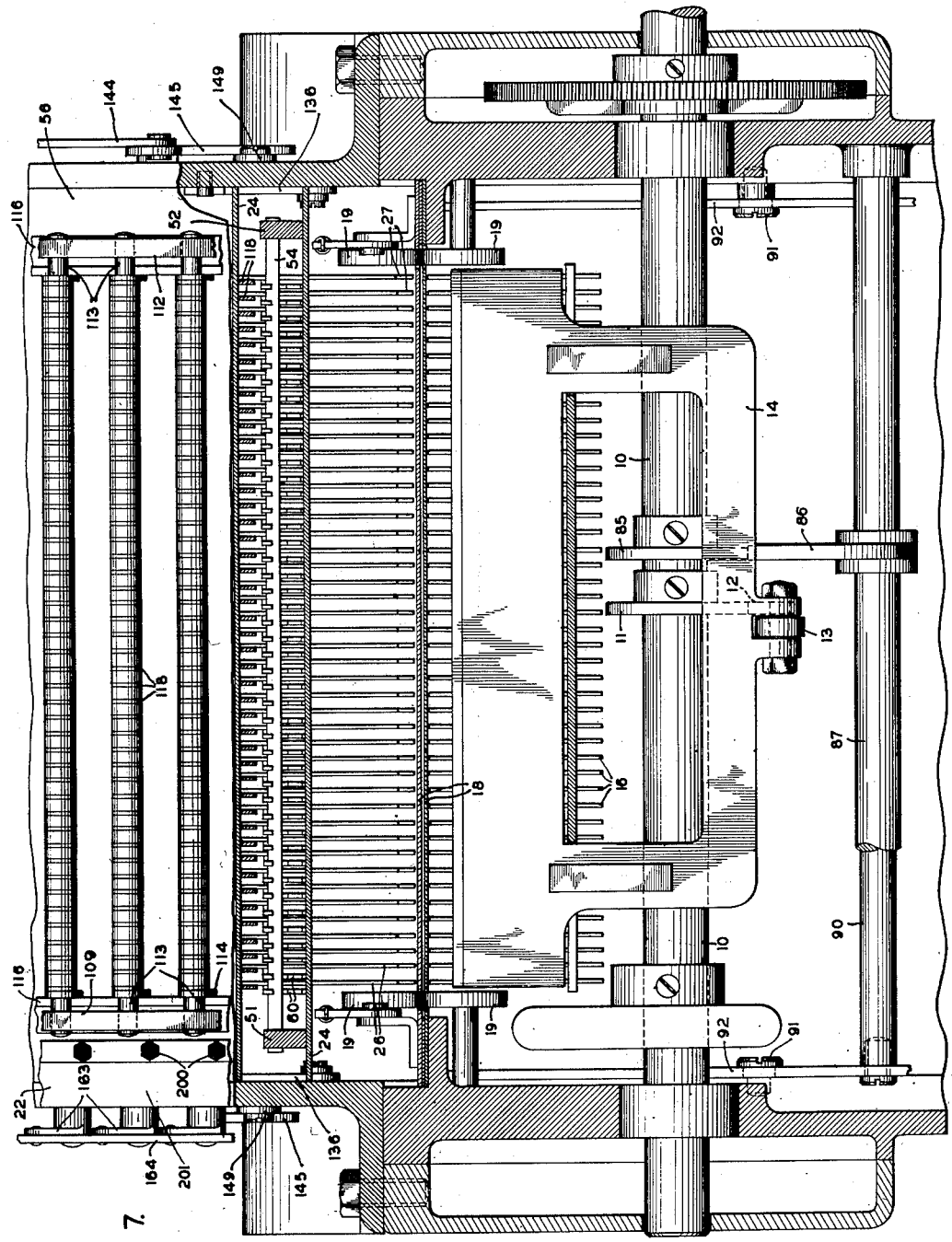
Fig. 7 is a view of the sensing mechanism in section, the section being taken through 7—7 of Fig. 2.

Referring to Figs. 2, 4, and 7 of the drawings:

A shaft 10 driven by a suitable source of power has mounted thereon a number of cams, of which cam 11, (Fig. 4) engages a roller 12 on a cross member 13, connecting plates 14 and 15, which form sides of a sensing box. The rotation of the cam causes the pin box to reciprocate vertically permitting sensing pins 16 to rise under the influence of compression springs 17 and enter perforations in plates forming a card sensing chamber 18. Suitably driven pairs of feed and skid rollers 19 cooperate with a picker knife in a manner well known in the art, to feed cards into the sensing chamber 18 while other pairs of skid and feed rollers 20 feed the card after it passes through the sensing chamber toward card pockets. Suitable card stop mechanism, not shown, is used in connection with the mechanism just described to arrest the movement of the cards and hold them in the sensing chamber while they are being sensed.

A framework, including end plates 22, 23, 55, and 56 is mounted over the sensing pin mechanism. The lower part of the framework is divided by a series of flat horizontal strips 24 into a number of sections, each of which controls a card pocket through the medium of a Bowden wire 200 (Fig. 6) as will be described in detail later. Plates 24 are provided with recesses 25 (Fig. 6) which serve as guides for a series of flat vertical plates or major pins 26, there being one plate for each sensing pin, the lower ends 27 of which (Figs. 2 and 4) are normally positioned directly over the sensing chamber, with the part 27 of each pin in register with, and arranged to be reciprocated by a corresponding sensing pin when said pin passes through a perforation in a card held in the sensing chamber.

Figure 8:
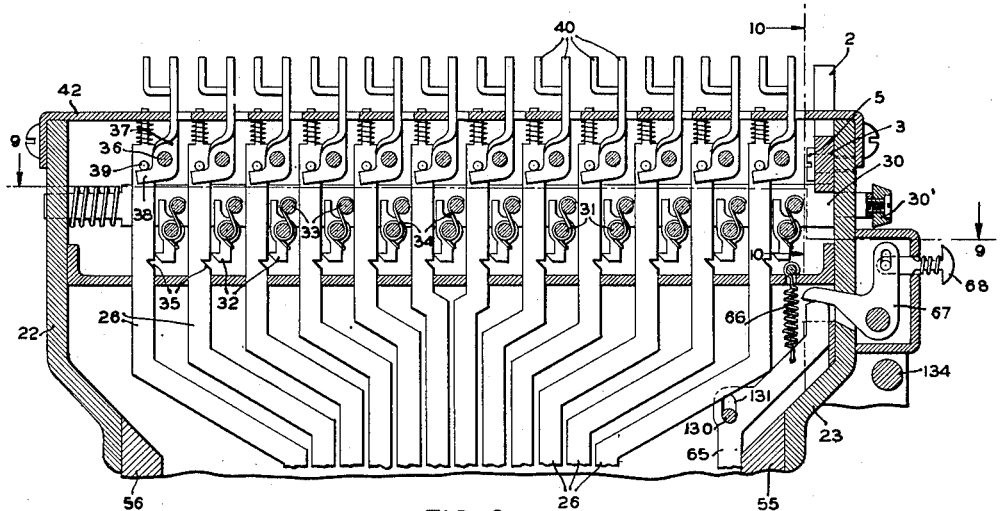
Fig. 8 is a section showing the manually operable keys for elevating the major pins.
Figure 9:
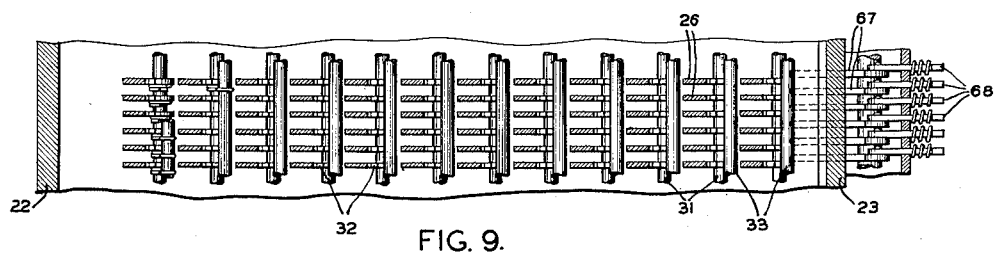
Fig. 9 is a section taken through 9—9 of Fig. 8.

A series of rods 31, (Figs. 2 and 8) supported between the upper parts of the frame plates serve as pivots for pawls 32, there being one pawl for each major pin 26. Rods 33 are supported between slides 30 and serve as stops for pawl springs 34 (Fig. 8), and also to disengage the pawls from notches 35 in the major pins, when slides 30 are reciprocated by means of bar 30'.

A third series of rods 36, there being one rod for each row of major pins, is mounted in the frame so that a rod is situated alongside the upper ends of each row of major pins. Said rods serve as supporting pivots for keys 37, there being one key for each major pin. The lower ends 38 of said keys are positioned to engage the underside of pins 39 in the major pins, when the upper portion 40 of said keys which project through slots 41 in the top plate 42 are manually rocked in a clockwise direction. The tops 40 of the keys in alternate rows are bent to provide more space between keys. Moving any key in this manner, elevates the major pin associated therewith until pawl 32 engages notch 35 retaining the major pin in an elevated position. The purpose of this operation will be explained shortly.

Springs 49 (Figs. 11 and 12) are provided to hold the minor pin carriers 60 and prevent them from rising when the minor pins are being elevated.

The card gate control mechanisms lying between each of the groups of plates 24 are identical physically, and all perform like functions, and, therefore, a description of one such mechanism will suffice for all.

Figure 3:
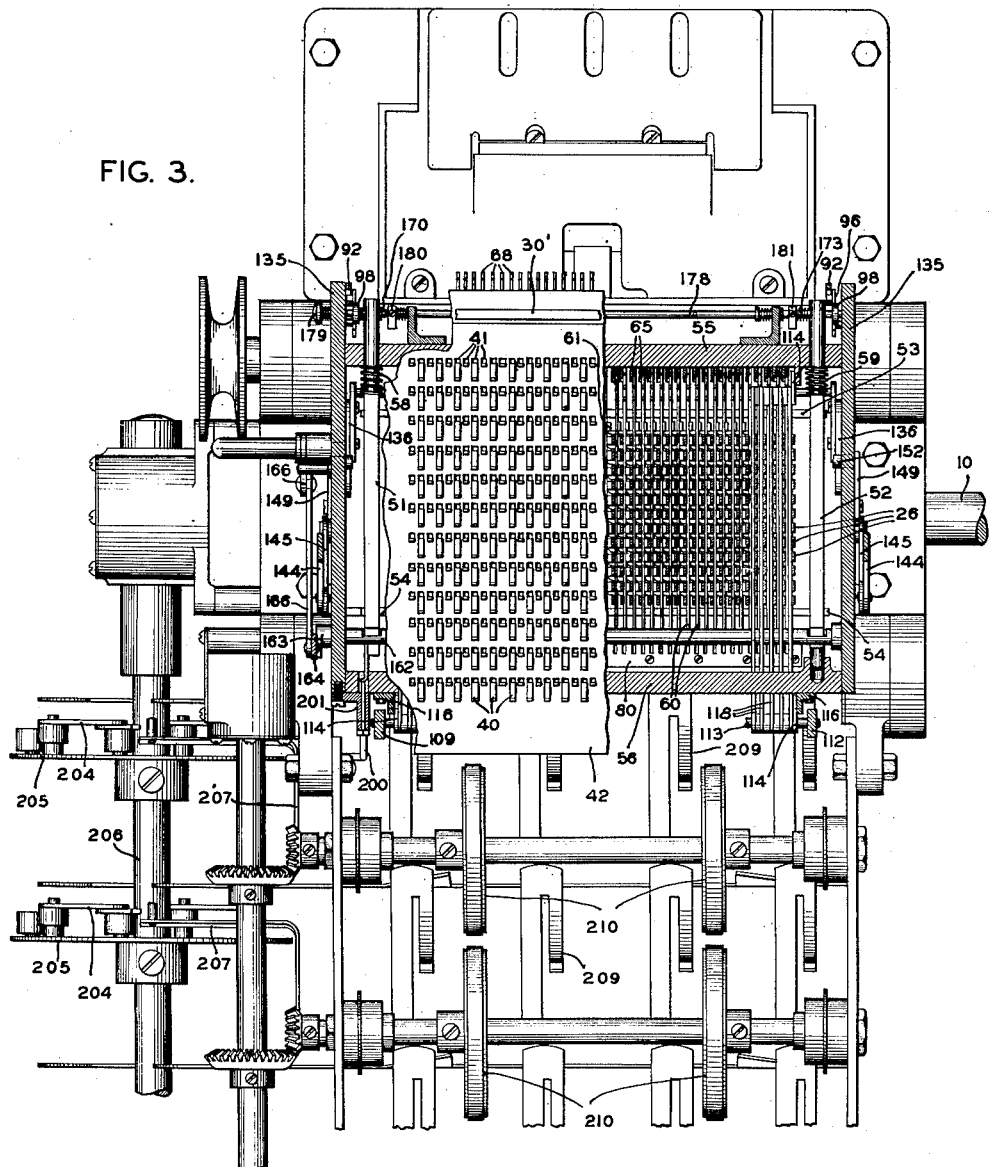
Fig. 3 is a plan view of the machine, partly in section.
Figure 6:
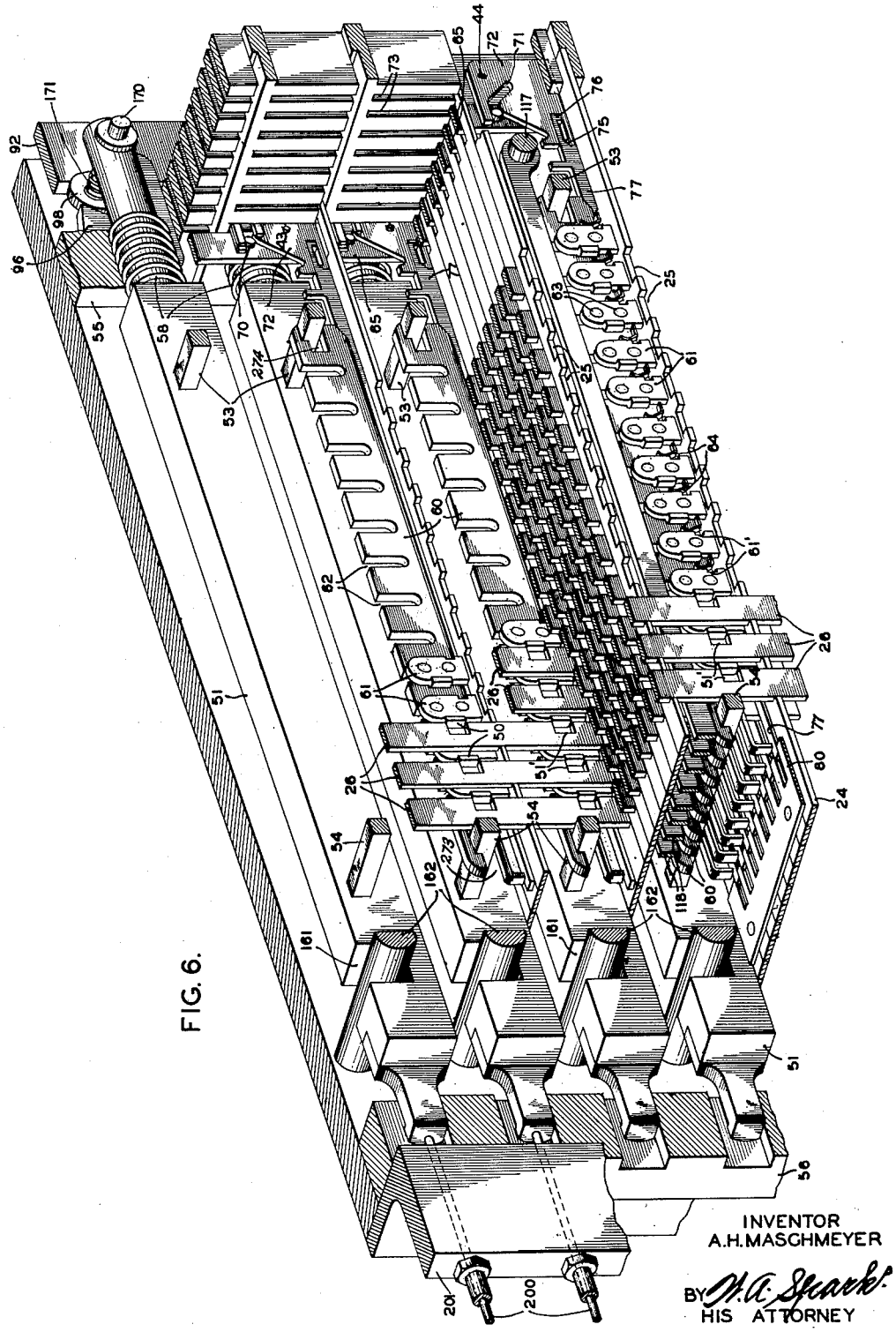
Fig. 6 is an isometric showing the selecting mechanism of the sorter.

Referring to Figs. 3 and 6, on opposite sides of the selecting unit, between each horizontal group of plates 24 lies a laterally moving framework consisting of a pair of bars 51 and 52, which are connected by cross members 53, and 54, the latter serving to support a series of minor pin carriers 60.

In Fig. 3 bars 51 and 52 are shown supported for longitudinal movement by suitable bearings in end plates 55 and 56. Compression springs 58 and 59 tend to force said bars toward the rear of the machine, or the bottom of the drawing, as shown in Fig. 3.

Each pair of cross members 53 and 54 cooperates with associated minor pin carriers 60 to control the operation of a card pocket.

Figure 18:
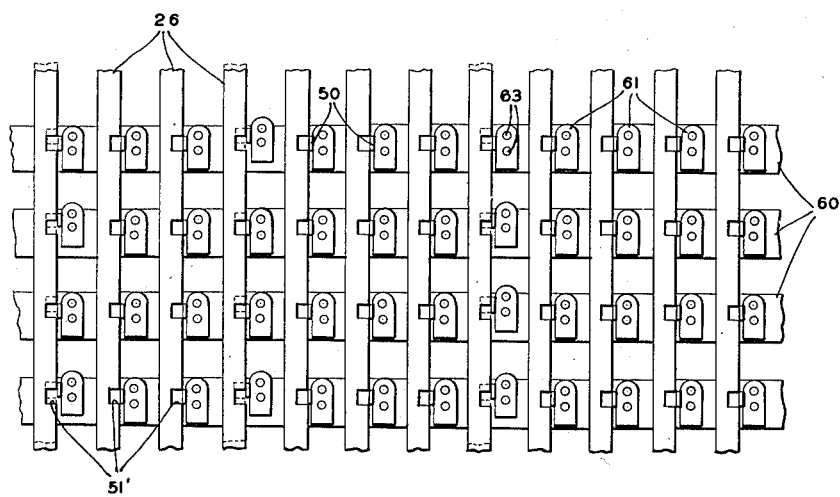
Fig. 18 is a diagrammatic showing of the minor pins and major pins.

There is a minor pin carrier 60 between each horizontal group of plates 24 for each column on a card, (Fig. 18) and a minor pin 61 on each carrier for each major pin 26 of the column. The minor pin carriers in the present embodiment are provided with a U-shaped notch 62 for retaining each minor pin. On each minor pin there is a pair of rounded studs 63 (Figs. 6 and 13), which fit rather closely into notches 62 supporting the pins and permitting them to reciprocate in a vertical direction in the notches.

A spring 64, (Fig. 6), attached to minor pin carriers 60, engages the side of each minor pin and serves to retain the pins in elevated position by engaging notches 61' in one side of the pins.

Each minor pin is provided with a lug 50 formed of a turned over section. Lug 50 is of such size that it projects out from the minor pin far enough to engage at times the edges of the adjacent major pins and to enter a notch 51' in one of these pins when the parts are brought into register.

Figure 11:
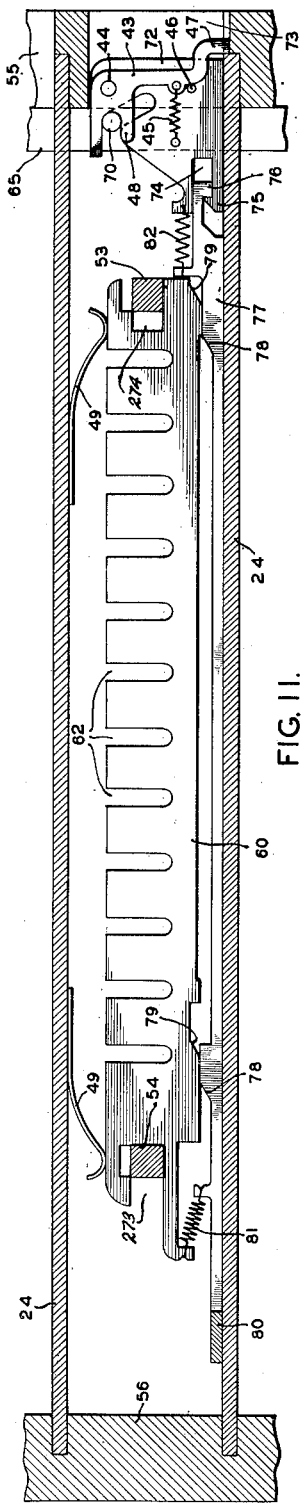
Fig. 11 shows a minor pin carrier in disabled position.
Figure 12:
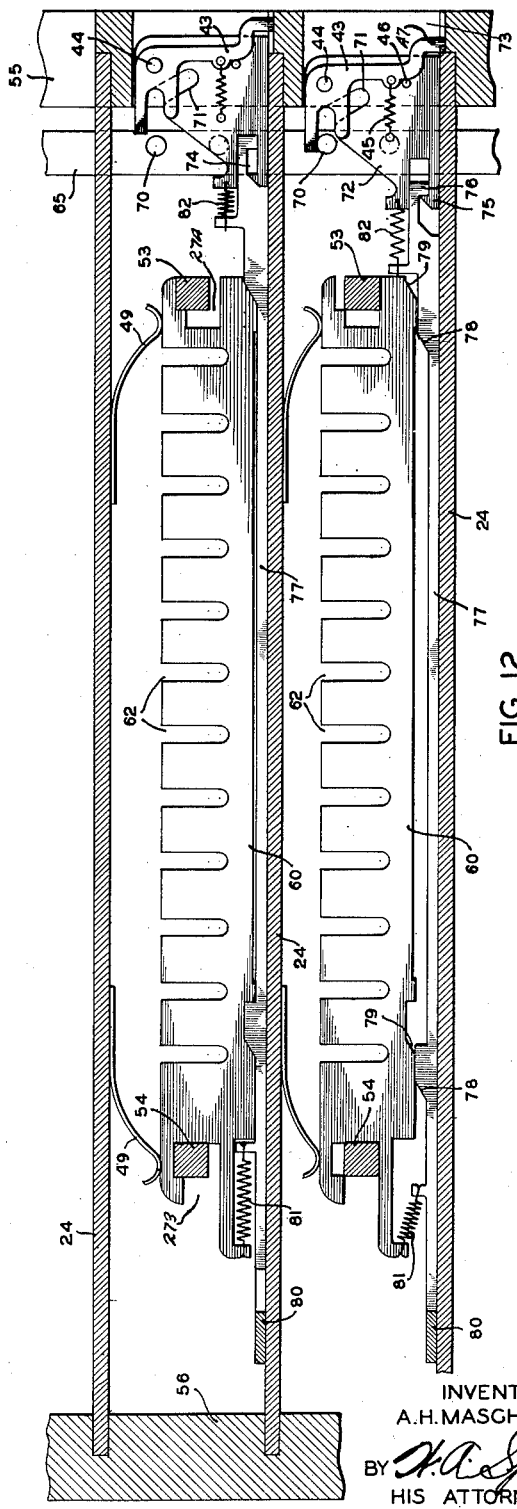
Fig. 12 shows one minor pin carrier in operative position, and one in disabled position.

Referring now to Figs. 2, and 11 to 14, inclusive, these drawings show an arrangement by which the minor pins may be set according to the patterns of a series of cards. In Fig. 2 vertical bars 65, shaped so as to follow the inner contour of the selector frame are free to reciprocate vertically in suitable guides. Springs 66 tend to hold the upper end of bars 65 against an arm of a bell crank 67; the other arm of said bell crank being connected by a link and pin connection to buttons 68 on the outside of the machine. There is a bar 65 and a button 68 for each column on the card to be sensed. (See Fig. 1 and Fig. 6.) Each bar 65 carries a series of studs or pins 70, each of which acts on an inverted V-shaped cam 71, formed in plates 72 which reciprocate in slots 73 in end plate 55 (Figs. 6, 11 and 12).

Figure 10:
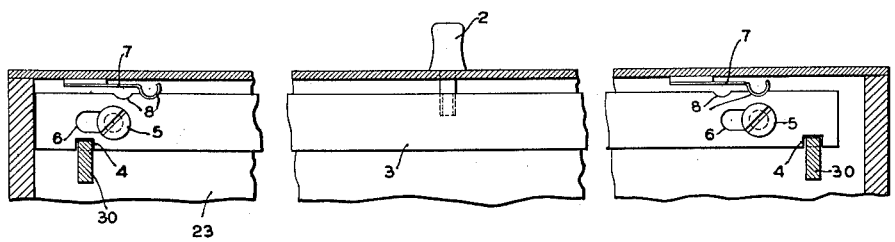
Fig. 10 is a section taken through 10—10 of Fig. 8.

During machine operation bar 30' and bars 30 are locked in depressed position by means of a slide 3, having notches 4, (Figs. 8 and 10) which is supported by screws 5 that pass through slots 6 into the frame. Springs 7 and notches 8 cooperate to retain bar 3 in either of two positions, in one of which bars may reciprocate and pawls 32 may catch any operated major pin, which is the position shown in Fig. 10.

When bar 30 is depressed and handle 2 on slide 3 moved to the right, bars 30 are locked in depressed position by means of slide 3 passing through a notch in bar 30 as indicated by dotted lines in the drawings. In this position pawls 32 are held out of contact with the major pins.

Referring now to Fig. 2, it will be seen that each major pin 26 is provided with an identical series of recesses, there being a recess in each, which, when said pins are in normal lowered position lies approximately midway between the horizontal divisions of the structure formed by the respective assemblies of strips 24.

Plates 72 (Figs. 11 to 14) are used for elevating or lowering slides 60 from one horizontal plane to another plane parallel therewith. Each plate 72 is provided with a slot 74 having an upwardly extending tooth 75 which engages a step 76 formed on one end of sliding member 77 having wedge shaped cams 78 formed on its upper surface that engage corresponding cams 79 formed on the under surfaces of slides 60. As shown in Fig. 6, suitable guide ways and stops are provided for members 77, such as comb-shaped strips 80. Springs 81 connect one end of each member 60 with the corresponding end of member 77, while the opposite ends of members 77 are connected by a somewhat stiffer spring 82 to the corresponding plates 72. The operation of the mechanism just described will be explained below.

Each plate 72 carries a latch 43 (Figs. 13 and 14) pivoted thereto by pivot 44. Spring 45 normally holds the latch against a pin 46 in 72 so that the latch toe 47 engages the end of a recess cut in the frame thereby preventing the member 72 from following the pin 70 in the first part of the restoring operation described below, (Fig. 12). During certain operations where slide 72 is forced toward the left by pin 70 passing down the right-hand side of cam 71, the latch is rendered ineffective by pin 70 engaging arm 48 of the latch rotating the same counter clockwise on its pivot against the tension of spring 45. Since the latch has no other function than that described, it is thought that reference to the same will be unnecessary hereinafter.

A cam 85 on main shaft 10 (Figs. 2 and 7) once each cycle, depresses arm 86 pivoted on shaft 87, elevating links 92, one of which is loosely pivoted to each end of shaft 90.

Each link 92 is supported for vertical reciprocation by shoulder screws 91 and 95 which extend through slots 94 in the links into the frame.

Pins in the longer arms of bell cranks 96 (Fig. 20) extend into slots 100 in each link 92 and serve to transmit the movement thereof to the following mechanism:—Bell cranks 96 are pivoted on studs 97 attached to the frame so that their shorter ends normally engage rollers 98 mounted on shafts 170 and 173 (Figs. 3, 6 and 21) which extend through ends of each set of members 51 and 52. Spring 93 (Fig. 2) which retracts 92 is stronger than the combined effect of springs 58 and 59 on members 51 and 52 respectively, and therefore it will be understood that the train of mechanism just described causes the reciprocation of all members 51 and 52, the extent of said reciprocation being limited in certain cases by the minor pin setting which will now be described.

In the embodiment of the invention shown in Fig. 2, it is possible to sort ten or less different card patterns from a stack of cards. Obviously, the machine might be constructed to sort a greater number of patterns if required.

Assume that the machine is set so that all minor pins 61 rest in their lower or normal position with all pin carriers 60 in their lower position, as shown in Fig. 13.

Under these conditions if blank cards were fed into the machine, all major pins would remain in their lower position, and at the point in the cycle where bell cranks 96 are rotated by links 92, each pair of bars 51 and 52 can travel their maximum distance on the return stroke due to springs 58 and 59, since all minor pin lugs 50 are aligned so as to enter the corresponding notches 51 in the major pins.

In preparing the machine for making an entirely new set-up, it is necessary to restore any minor pin carriers which have been disabled, (that is, elevated by members 77, as shown particularly in Fig. 11), to their lower position, as shown in Fig. 13.

In order that all plates 72, regardless of their position, may be moved to the extreme right, it is necessary that all bars 65 be moved away from frame 55 (Fig. 2) in such a manner that pins 70 follow a horizontal path, at the end of which they and the bars 65 are forced to their extreme downward position. This causes the pin 70 to engage the outer faces of cams 71 on slides 72, thus causing said slides, as well as slides 77 to move to their extreme position to the right, as shown in the upper section of Fig. 14. The following mechanism is used for this purpose:

In order to produce uniform parallel motion of the various parts about to be described, the restoring mechanism is duplicated on opposite sides of the machine, the corresponding parts being connected where required by bail bars extending across the machine.

Figure 1:
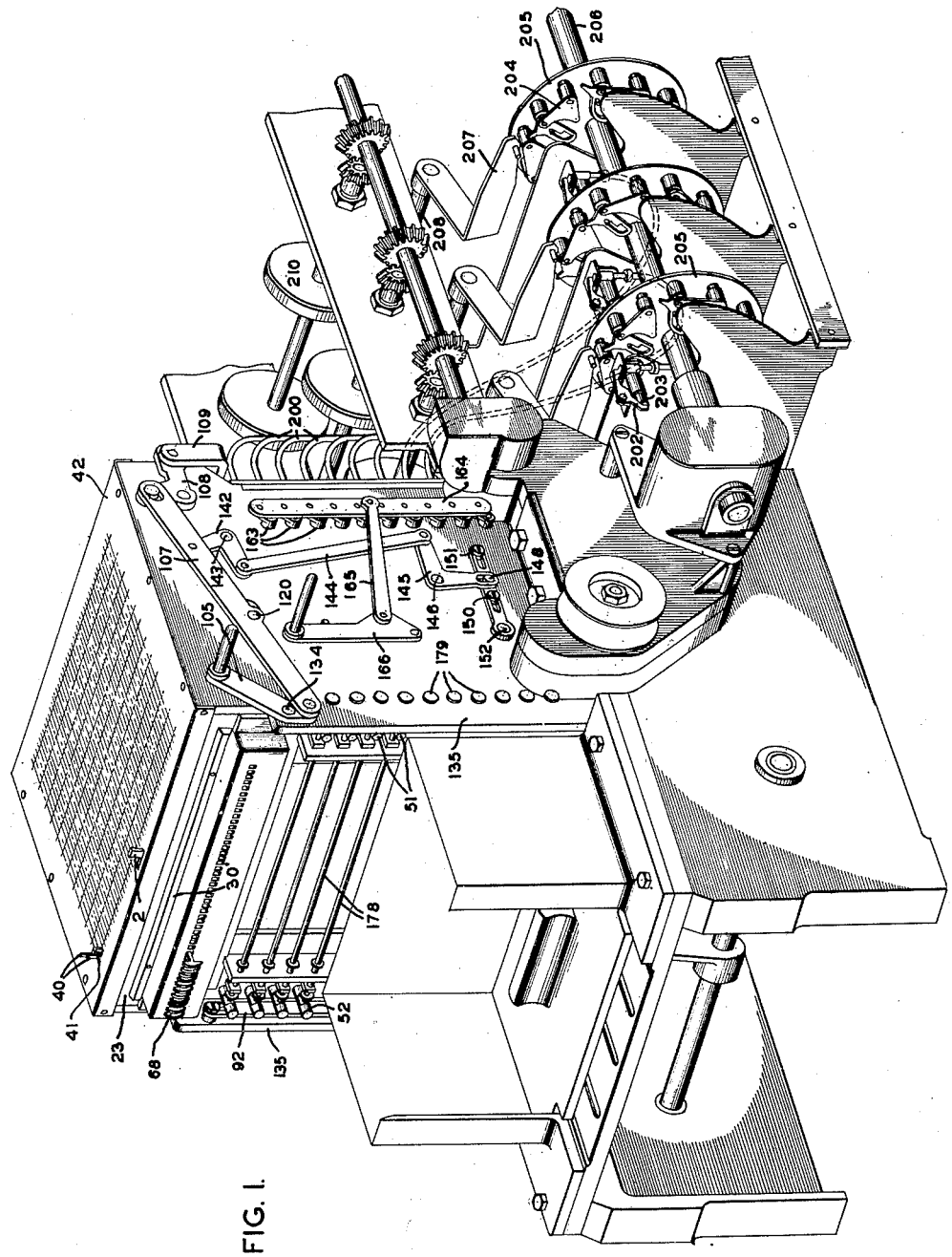
Fig. 1 is a perspective showing the front and side of the invention.
Figure 15:
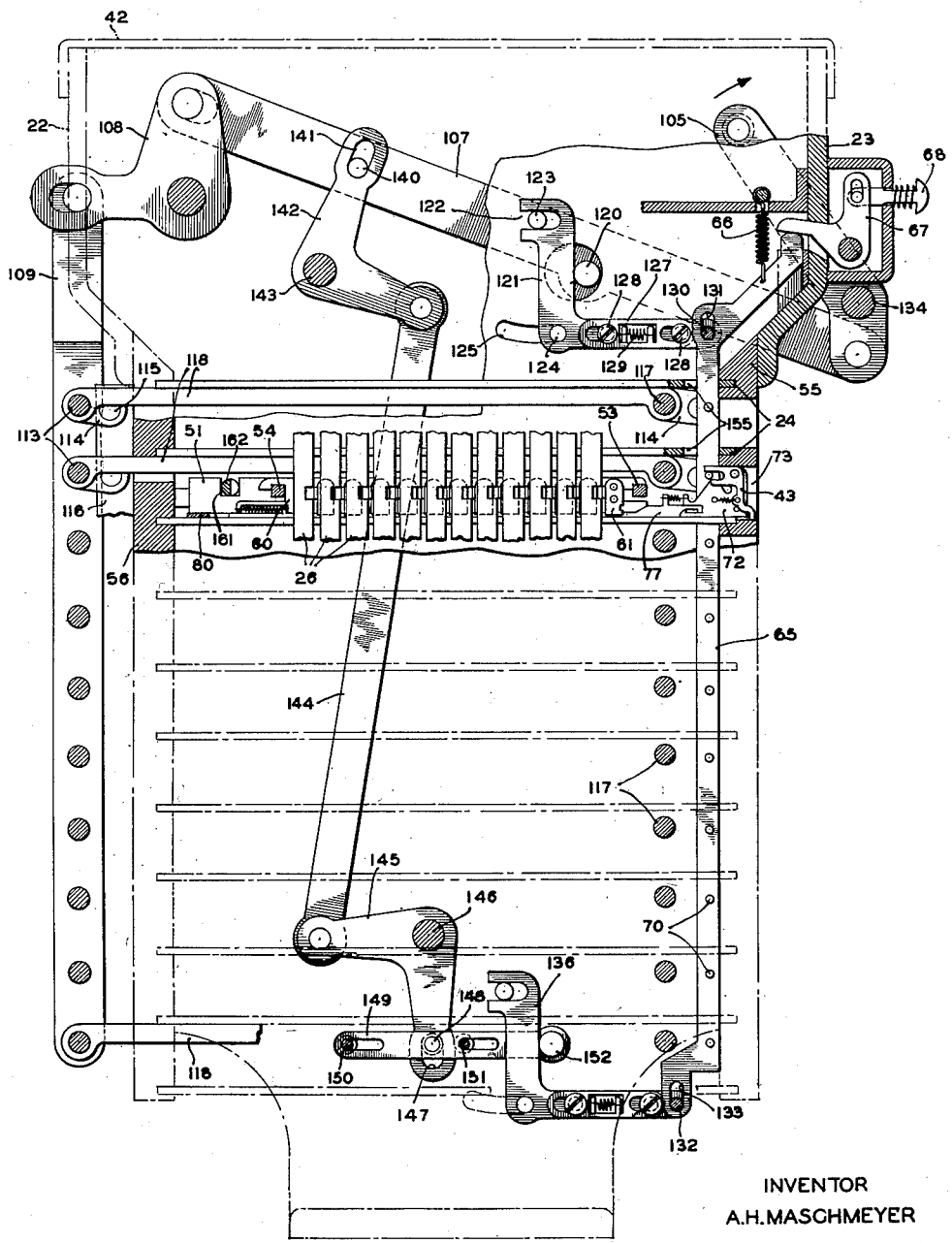
Fig. 15 shows the mechanism for disabling the minor pin slides in normal position.
Figure 16:
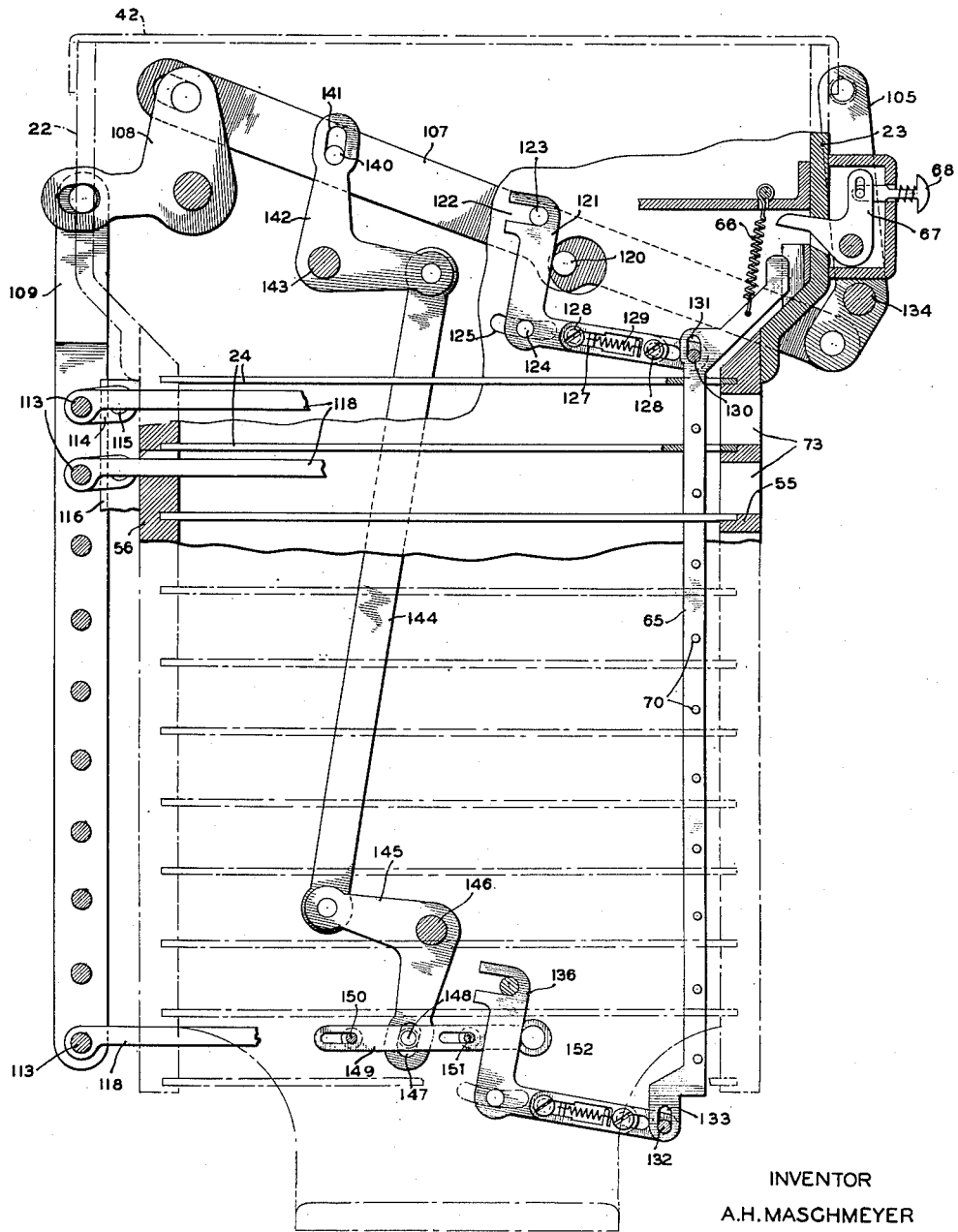
Fig. 16 shows the mechanism for disabling minor pin slides moved to its first position prior to disabling minor pin slides.

Referring to Figs. 1, 15 and 16, it will be understood that crank 105 is fixed to shaft 134 which is free to turn in suitable bearings in wings 135 on opposite sides of the machine, so therefore bail bars 130 and 132, described below, are connected between like bell cranks, and that any movement of crank 105 is communicated by shaft 134 to a like mechanism on the opposite side of the structure.

Referring to Fig. 15 which shows the restoring mechanism in its normal position:—When crank 105 is moved in a clockwise direction in this figure, pin 120 carried by link 107 engages a bell crank shaped member 121 having a slot 122 in one arm in engagement with pin 123 fixed to the frame. Pin 124 in the apex of the bell crank is free to follow a partly arcuate supporting slot 125 in the frame. The other arm of the bell crank supports a link 127 provided with slots at opposite ends which ride freely on shoulder screws 128 threaded into 121. Spring 129, one end of which is fastened to a pin in 121 and the other end to 127, tends to shorten the extensible arm of the bell crank just described. Bail bar 130 extends across the machine through slots 131 in the upright bars 65.

Bail bar 132 secured to bell cranks 136 similar to 130, extends through slots 133 in the lower ends of bars 65.

Bell cranks 136 are connected to links 107 in such a manner as to reproduce the movement of bell cranks 121. This connection consists of pin 140 in link 107 which rides in slot 141 in one arm of bell crank 142, pivoted to frame by stud 143. Link 144 connects 142 with bell crank 145 pivoted to frame by stud 146, the latter bell crank having a slotted arm 147, said slot passing over a pin 148 on slotted slide 149 which is arranged to be reciprocated by the bell crank on studs 150 and 151 in the framework.

Slide 149 carries a stud 152 which engages an arm of bell crank 136 causing the latter to move in the same manner as bell crank 121.

Pin 120 in link 107 engages bell crank 121 at substantially the mid-point between slot 122 and pin 124 which rests in slot 125 in the frame. Part of slot 125 is straight and substantially horizontal, and the part to the left of the drawing is arc-shaped, pin 123 being the center of the arc. This arrangement is followed in all four bell cranks of this type. Since pin 124, from its position of rest as shown in Fig. 15, travels a horizontal path on the rotation of crank 105, and slot 122 in 121 is parallel thereto and guided by pin 123 fixed to the frame, it follows that the vertical arm of 121 will be moved to the left (Fig. 15) while for a time still maintaining its horizontal position. Likewise other bell cranks 136 will be similarly moved, and bars 65 connected thereto by bail bars 130 and 132 will be moved to the left during the initial movement of crank 105. As the rotation of 105 progresses, further movement of slot 122 in 121 will be stopped by pin 123. At this point pin 124 has just reached the arcuate section of 125, whereupon pin 124 and bail 130 will tend to describe concentric arcs with pin 123 as a center, but the arcuate motion of bail 130 will be limited by bar 65 engaging the forward edge of its guides 155 (Fig. 15), whereupon the remainder of the rotary movement of bell crank 121 will cause spring 129 to yield, permitting the slide 127 to lengthen the arm of the bell crank, thus forcing 65 downward which causes pins 70 carried thereby to engage the forward parts of cams 71 forcing slides 72 to the extreme right, as shown in Figs. 13 and 14, restoring all minor pin carriers to their lower or operative position.

Figure 17:
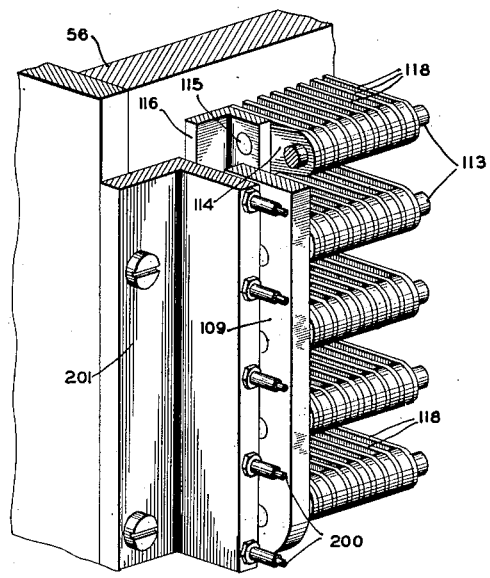
Fig. 17 is an isometric showing the minor pin restoring bars.

When crank 105 is turned from the position shown in Figs. 1 and 15, the motion is communicated by link 107 and bell crank 108 to a bar 109 which is forced downward. Bar 109 is connected to a similar bar 112 (Fig. 7) by a series of bail bars 113 (Fig. 17). These bail bars in turn, at their ends, carry short bail arms 114 which are pivoted on studs 115 secured to angular supporting members 116, both of the latter being disposed on the same side of the machine. On the opposite side of the machine (Fig. 15) is a pair of members similar to 116 and these provide means for pivoting the ends of a similar set of links 114 which have their opposite ends pivoted to bail bars 117 which correspond to 113. Bail bars 113 and 117 are connected by restoring bars 118, one of which overlies each row of minor pins. In the construction just described, when bar 109 is forced downward by crank 105 all bars 118 move therewith with a mutually parallel motion and each bar 118 engages the tops of the minor pins which have been elevated for the previous selection and depresses them to their lower or unselected position.

As previously stated, the bars 51 and 52 are normally reciprocated by means of vertical members 92, bell cranks 96 and compression springs 58 and 59.

For certain purposes, particularly when setting up the machine, it is necessary to reciprocate the bars 51 and 52 in each section individually. For this purpose, the following mechanism is provided to disconnect the bars from bell cranks 96.

Referring to Figs. 19, 20 and 21, disc 98 is mounted on a rod 170 extending through 51. Spring 171 serves to hold collar 172 in normal position against 51 so that 98 is in position to engage 96. A similar arrangement is provided for the disc 98 associated with bar 52, consisting of a supporting rod 173, having a collar 174 which is held against 52 by means of spring 175 and collar 176. A rod 178 is provided to connect button or key 179 to both mechanisms. This rod is merely an extension of key 179 which moves endwise when the key is pressed, and blocks 180 and 181 thereon are for the purpose of ensuring the transmission of any movement of the key when the shafts 171, 173 and 178 are not aligned. By means of the mechanism just described, discs 98 may be pressed out of alignment with bell cranks 96, thus permitting the bars 51 and 52 to snap rearward under the influence of compression springs 58 and 59, as will be clear from inspection of Fig. 3.

Referring to Figs. 1, 3 and 6:—Bars 51 and 52 may be restored from their disconnected position to normal position as follows:

Each of said bars is provided with a recess 161 through which a frame supported round bar 162 extends, the part which passes through said notches being half-round, with the flat face normally positioned so as not to interfere with the reciprocation of bars 51 and 52, or the assembly carried thereby. When bars 162 are rotated, the rounded section engages the vertical faces of recesses 161 camming said bars back to their normal position where the discs thereon are again retained by bell cranks 96.

A crank 163 is attached to an end of each bar 162, and bar 164 connects the ends of said cranks, while link 165 connects 164 to a crank 166. With this arrangement, when crank 166 is operated, any or all of bars 51 and 52 will be reset.

Assuming that the various parts of the machine have been restored to a normal position by crank 105, then any section may be set up to select a card pattern by pressing the key 179 in the desired section which releases members 51 and 52 from bell cranks 96 permitting the particular assembly to move to its extreme position, since all minor pin lugs are aligned with corresponding recesses on the major pins. Wherever a perforation occurs in the card pattern about to be set up, the corresponding keys 40 in the top of the machine are operated, elevating the associated major pins, and also the minor pins, since the lugs of the latter are resting in the recesses in the major pins. When the set-up has been completed in one section, crank 166 is operated, and the half-round bars connected thereto restore members 51 and 52 to their normal position, withdrawing the minor pins from the slots in the major pins. The minor pins which have been elevated retain their position due to the springs 64 engaging notches 65.

Before starting to set up a new card pattern in another section, all major pins that have been elevated are released from their latches 32 by pressing bar 30' connecting bars 30, which causes shafts 33 to strike the tops of latches 32, causing them to withdraw from notches 35.

The remaining sections of the machine may be set up as described above.

At times, it may be desirable to sort for less than the entire number of possible perforations in a card. In such a case parts of the various sections may be disabled so that the position of the minor pins in the disabled part of a section has no effect on the operation of the laterally reciprocating elements in that section.

The disabling operation consists of elevating the minor pin carriers 60 for the columns which are to be ineffective, so that cross members 53 and 54 reciprocate freely in the openings 273 and 274 in minor pin carriers 60.

The lower minor pin carrier in Fig. 13 is shown positioned prior to disabling, with cross members 53 and 54 positioned toward the left, that is, the cross members are in the position into which they move when the button 179, corresponding to this section, has been pushed, and the members 51 and 52, as described in detail above, accordingly released. Now, if button 68 associated with bar 65 in the drawing is pressed, bar 65 is forced downward and stud 70 carried thereby engages the right-hand face of cam 71 forcing member 72 toward the left causing the cam tooth 75 of member 72 to engage member 77, and, since minor pin carrier 60 is restrained from further movement to the left by the cross member 54, cams 78 are forced under the cam surfaces formed on the under side of 60, elevating 60 to its disabled position shown in the lower half of Fig. 14, where it remains until a different set-up is made. Incidentally, with the disabling of a column, since the minor pin lugs were previously moved into the recesses in the major pins by the release of members 51 and 52, all major pins in the column will be elevated and latched in their upper position in the same manner as though the keys 40 for that column were operated. However, this has no effect on the machine, since such keys are released when bar 30' is pressed prior to setting up another section.

When the laterally moving assembly of cross members 53 and 54 is restored by crank 166, after the setting up of a section has been completed, the mechanism of the disabled columns occupies the position shown in Fig. 11, so when the machine is in operation, the disabled minor pin carriers are prevented from reciprocating but the bars 53 and 54 are free to reciprocate, since they are aligned with and may freely pass through openings 273 and 274 in minor pin carriers 60.

The card pocket and conveying mechanism is preferably the same as that described in the above Lasker patents, though obviously, the selecting mechanism disclosed herein might be applied to other apparatus. Such mechanism is well known to those familiar with the punched card art. Referring to Figs. 3, 6 and 17, the sheaths of Bowden wires 200 are fastened into a suitable supporting member 201 so that a Bowden wire is positioned to be operated by a member 51 in each section.

Movement of the core of the Bowden wire transmits movement to a bell crank 202 (Fig. 1), causing the bell crank to rock about its pivot to extend a plunger 203 into the path of one of a series of tripping cams 204 mounted upon each of a series of tripping discs 205. There is a tripping disc for each pocket. All discs are mounted upon a tripping shaft 206, which is driven from the main shaft in such a way as to be synchronized with the sensing and selecting mechanism.

When a tripping cam 204 encounters an extended plunger 203, the cam moves radially out from the periphery of the disc and is locked in its outward position. After the timing shaft, and the timing disc involved, have rotated a sufficient amount, the tripping cam strikes an arm 207 causing the rotation of shaft 208 upon which said arm is secured. Shafts 208 carry card gates 209 (Fig. 3) so that the operation of the arm results in the opening of the gate.

Since plungers 203 are mounted in different positions, relative to the circumference of the disc, it is obvious that the time between the operation of a plunger and the operation of the associated card gate varies. As clearly described in Patent No. 1,315,370, the construction is such that the time between the operation of a particular plunger and the associated card gate is equal to the time required for the transporting rollers 20 and 210 to convey the card from the sensing chamber to the gate.

From the above, it is seen that each card is separately sensed and deposited in a pocket with all other cards having the same pattern.

Cards bearing patterns which do not correspond to those set up in the various sections do not operate any of the card gates, and consequently pass into a discard pocket (not shown) at the end of the sorter.

Another embodiment of the invention is shown in Figs. 22 and 23. This modification differs from that just described in that it is particularly adapted for sorting so-called 90 column cards indicated generally by Fig. 24. The modification consists of using a pair of independent minor pin carriers for each column. By this arrangement, either half of a column may be disabled, while the other half is active. Only two views of this modification are shown, since the operation and structure is practically the same as that of the machine described herein in detail, the difference being that the minor pin carriers are only half-column long and a separate disabling mechanism is provided for each minor pin section.

Referring particularly to Fig. 22, bar 51 is shown provided with a recess, at substantially its midpoint through which extends the half-round bar 162 which is used for restoring the laterally moving assembly in the same manner as the previous modification.

Bars 51, and 52 (not shown) are connected by square cross members 53, 54, 53' and 54', each pair of cross members carrying a set of minor pin carriers, there being, in the present embodiment, two minor pin carriers for each column, and the drawing shows the minor pin carriers 60 each one-half column long though obviously these proportions might be varied if required.

Bars 118 are common to both sets of minor pins in a column and are used to reset the minor pins as previously described.

Sliding member 72 together with sliding cam member 77 disable pin carriers 60 associated therewith as previously described. Sliding member 72' and the cam member 77' move in the same direction as 72 and 77, that is toward the left of the drawing when the minor pin carriers 60 associated therewith are being disabled. This is clear from the way the cams are shown in the drawing.

Owing to the fact that members 72' operate in the reverse direction, a slightly different arrangement is used for operatively connecting members 77' and 72', which consists of connecting 72' to the frame by means of spring 82', which is just strong enough to keep the tooth 75' of 72' in engagement with 76' at the end of minor pin carrier 60.

Figure 25:
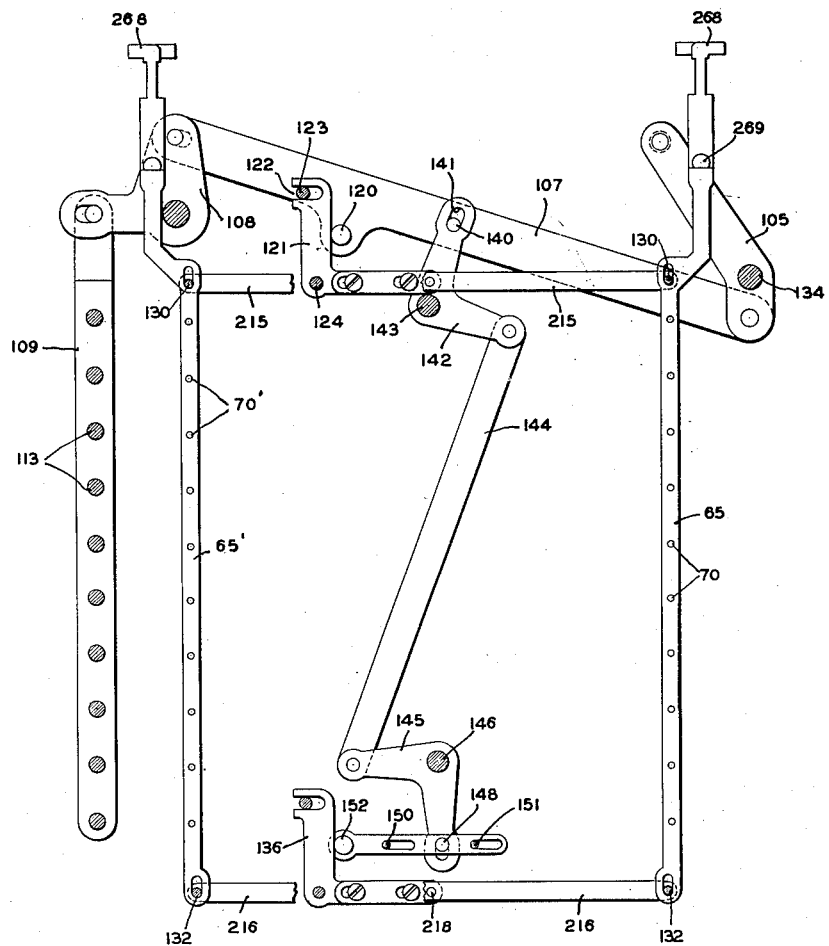
Fig. 25 is a diagrammatic representation of the 90 column sorter disabling mechanism.

Referring to Fig. 25, vertical members 65 and 65' are connected at the top by link 215 and at the bottom by link 216, which in turn are connected to the arms of bell cranks 121 and 136 by pins 217 and 218 respectively. It will be understood from the foregoing when crank 105 is operated that vertical member 65' follows the movement of 65, so when it is desired to prepare the machine for a new set-up, 65 resets all disabled minor pin carriers as previously described, while 65' resets any disabled minor pin carriers associated therewith in the same manner, except that the latter moves toward the frame prior to commencing its resetting operation while 65 moves away from the frame. During the course of the resetting operation as 65' is moved downward, pins 70' therein engage the left-hand side of cam 71' in member 72' causing the tooth 75' thereof to force cam members 77' of those minor pin carriers 60 which may have been disabled toward the right until the recesses in the bottom of 60 coincide with the cams on members 77' whereupon the carriers which have been elevated may drop to their normal positions.

In order to permit this operation on opposite sides of the frame, it is necessary for some sort of a flexible or sliding connection to be provided between the keys which disable the minor pin carriers in the respective columns. Fig. 23 shows an arrangement for this purpose which consists of keys 268 which correspond to and function as keys 68 in the previous embodiment, the difference being that keys 268 are mounted in suitable apertures in the top of the machine, and each key carries a stud 269 having a flat face which engages a similar flat surface 270 at the top of each vertical member 65. Springs 271 serve to hold shoulders 272 of the key in the normal position against the top plate. With this construction, it will be understood that any key 268 may be pushed down depressing the bar 65 associated therewith for column disabling purposes as previously set forth.

Assuming that it is desired to set up the machine so as to segregate cards having like patterns from a stack of cards, the necessary operations may be summarized as follows:

1. Crank 105 is rotated to restore all minor pins, and to restore all disabled columns to operating position.
2. Key 2 is removed to release latches 32 so as to permit them to engage the corresponding notches 35 in the major pins.
3. The button 179 of the desired section is pressed, permitting the minor pins of that section to enter the recesses in the major pins.
4. Keys 40 are operated to elevate the minor pins according to the perforations in the particular pattern that is desired to be sorted.
5. Any desired columns are disabled by pushing keys 68.
6. After these operations have been performed, the setting up of a pattern in the particular section has been completed and the section is restored to operating position by means of lever 166.
7. After a section has been set up, bar 30' is pressed to release latches 32 from the notches in the major pins, permitting the pins to drop to their normal position.
8. The remaining sections may be set for desired patterns in the manner just described.
9. After all sections have been set up, bar 30' is latched in its depressed position by knob 2 and slide 3 so as to keep latches 32 out of engagement with the major pins, and then the machine is ready for use. In the present embodiment of the invention there is provision for sorting ten or less different card patterns.

While there are above described but a limited number of embodiments of the invention, it is possible to produce still other embodiments without departure from the inventive concept above disclosed, and it is, therefore, desired that only such limitations shall be imposed on the appended claims as are stated therein, or required by the prior art.

What I claim as new and desire to secure by Letters Patent, is:

1. In a device of the character described, a card sensing mechanism, cards having patterns thereon adapted to be sensed thereby, a plurality of plates adapted to be variably positioned according to the card being sensed, a plurality of pocket selecting sections through which said plates pass, members in the respective sections adapted to be set according to different card patterns, and card pocket mechanism operable when the card pattern being sensed coincides with the setting of the members in one of said sections.

2. In a device of the character described, a card sensing mechanism, cards having patterns thereon adapted to be sensed thereby, a plurality of plates adapted to be variably positioned according to the card being sensed, a plurality of pocket selecting sections through which said plates pass, a group of members in each of said sections, each group of members being settable according to a different card pattern, a pocket gate associated with each group, and means for operating a gate when the pattern being sensed coincides with the setting of one of said groups of members.

3. In a device of the character described, a card sensing mechanism, including a plurality of plates adapted to be variably positioned according to the card being sensed a plurality of members arranged in groups which cooperate with said plates, means for setting the members of each of said groups according to different predetermined card patterns, means for reciprocating said groups, card pocket mechanism associated with each of said groups, said mechanism being operable when said plates are positioned according to the setting of the members of a group.

4. In a selecting mechanism a plurality of plates each adapted to be set in either of two positions, a frame, a plurality of settable members in said frame arranged in groups, a carrier for each group of members, means for reciprocating said frame, means including said plates and said members for limiting the travel of said frame, and means for positioning any or all of said members so as not to affect the reciprocation of said frame.

5. In a device of the character described, a card sensing mechanism, cards of different patterns adapted to be sensed thereby, a plurality of plates controlled by said sensing mechanism and adapted to be positioned according to the pattern on the card being sensed, a plurality of sections, each having members positioned according to different predetermined card patterns, a plurality of reciprocating carriers for said members, means including said plates for limiting the reciprocation of said carriers, and card gate mechanism, said card gate mechanism being operable when a carrier reciprocates to the greatest extent.

6. In a card sorter, a plurality of sections, a group of members in each section, means for setting each group of members to correspond to a card pattern, means for retaining said setting during a sorting operation, a card sensing mechanism common to all of said groups, and means for comparing simultaneously the patterns of all of said groups with the pattern of a card being sensed, card pocket control means individual to each of said groups, and means for operating a card pocket when the pattern of a card being sensed coincides with the setting of the members of a group.

7. In a card sorter, means for sensing every index point on a card, a plurality of sections common to said means and each including members arranged in columns corresponding to the columns of index points on a card, means for setting said members to correspond to the perforated and imperforate areas on a card, means to retain said setting for a series of sorting operations, and means for disabling predetermined columns in the respective sections.

8. In a device for sorting cards, a plurality of groups of members, means for setting the members in the respective groups to correspond to different card patterns, a carrier for each group of members, means for reciprocating the carriers in unison, means including said members tending to reduce the extent of the reciprocation of the respective carriers, and means including a card and a card sensing means for permitting a predetermined carrier to reciprocate a maximum distance.

9. In a card sorter, card sensing means comprising card sensing pins, means for reciprocating said pins in order that they may be displaced according to the pattern of a card being sensed, a second sensing mechanism comprising a plurality of groups of manually displaceable members, means for setting the members so that each group corresponds to a predetermined card pattern, means for reciprocating the groups individually, means for reciprocating all of said groups so that the sensing pins are sensed by all groups simultaneously, and card pocket mechanism adapted to be operated when the setting of the members of a group coincides with the card being sensed.

10. In a device of the class described, a mechanism for sensing punched cards, a plurality of plates actuable by the sensing mechanism, a plurality of sections each comprising a reciprocable assembly and a plurality of members supported thereby and adapted to cooperate with said plates to control the extent of reciprocation of said assembly, and a plurality of card pockets each adapted to be controlled by an individual one of said assemblies in accordance with the extent of reciprocation of said assembly.

11. In a device of the class described, a mechanism for sensing punched cards, a plurality of plates actuable by the sensing mechanism, a plurality of sections each comprising a plurality of members adapted to be pre-set in accordance with a card pattern and a reciprocable assembly adapted to be reciprocated to a maximum extent when the pre-set pattern of said members corresponds to the pattern of a sensed card and to be prevented from being reciprocated to this extent when said patterns fail to correspond, and a plurality of card pockets each adapted to be conditioned to receive a card when an individual one of said assemblies is reciprocated to its maximum extent.

12. In a device of the class described, a mechanism for sensing punched cards, a plurality of plates actuable by said mechanism, a plurality of sections each comprising a reciprocable assembly and a plurality of members adapted to be pre-set in accordance with a card pattern, said members being provided with individual lugs adapted to enter corresponding notches in said plates to permit said assembly to reciprocate to a maximum extent whenever a card having the same pattern as said pre-set pattern is sensed, and a plurality of card pockets each adapted to be conditioned to receive a card when an assembly individual thereto is reciprocated to a maximum extent.

13. In a device of the class described, a selector plate, a plurality of independently settable members associated with said plate, a recess in said plate for each member, releasable spring actuated means for moving a selected one of said members into the corresponding recess in said plate, means for elevating said plate to raise the member positioned in a recess of said plate, and means for holding the raised member in its new position.

14. In a device of the class described, a plurality of independently settable members, a selector plate adapted to engage said members, means for moving any member into engagement with said plate, means for moving said plate to bring the engaged member into different position, means independent of said plate for holding said member in its new position, and means for thereafter disengaging said plate from said member.

15. In a device of the class described, a mechanism for sensing patterns in punched cards, a plurality of plates adapted to be positioned according to the pattern of a card being sensed, a plurality of card pockets, a gate for each pocket, a plurality of sections individual to said pockets, a plurality of members in each section adapted to be pre-set in accordance with a card pattern, the members in each section cooperating with said plates to compare the pattern set up in each section with the pattern of a card being sensed, and means effective when the pattern of any section corresponds to the pattern of a sensed card for conditioning the gate of the pocket individual to the section to open to receive the card.

16. In a card sorter, a plurality of sections, a group of members in each section equal to the number of perforable positions on a card, means for setting each group of members to correspond to a card pattern, means for retaining said setting during a sorting operation, and means for comparing simultaneously the patterns of all of said groups with the pattern of a card being sensed.

AUGUST H. MASCHMEYER.